United States Patent [19]

Pillot et al.

[11] 3,803,502

[45] Apr. 9, 1974

[54] PCM DETECTOR

[75] Inventors: Jean Noel Pillot, Maurepas; Pierre Zaccone, Boulogne Billancourt, both of France

[73] Assignee: International Standard Electric Corporation, New York, N.Y.

[22] Filed: Mar. 7, 1973

[21] Appl. No.: 338,706

[30] Foreign Application Priority Data

Apr. 18, 1972 France .............................. 72.13590

[52] U.S. Cl............ 329/104, 179/15 AP, 325/38 R, 325/321, 328/110

[51] Int. Cl. ............................................ H03k 9/00

[58] Field of Search ............ 329/104; 328/109, 110, 328/11 L; 325/38 R, 38 A, 321, 322; 179/15 AP

[56] References Cited

UNITED STATES PATENTS

| | | | |
|---|---|---|---|
| 3,073,904 | 1/1963 | Davis | 179/15 AP |
| 3,175,212 | 3/1965 | Miller | 325/38 R X |
| 3,310,743 | 3/1967 | Cleobury et al. | 179/15 AP X |
| 3,587,088 | 6/1971 | Franaszek | 325/38 A X |
| 3,723,879 | 3/1973 | Kaul et al. | 325/38 R |

*Primary Examiner*—Alfred L. Brody

*Attorney, Agent, or Firm*—John T. O'Halloran; Menotti J. Lombardi, Jr.; Alfed C. Hill

[57] ABSTRACT

There is disclosed a detector to determine the binary value of high speed PCM bits transmitted in NRZ or bipolar form. The incoming bits are distributed to *n* channels so that the detection time available for each bit is multiplied by *n*. In each channel, a capacitor is charged by a current having a value depending on the instantaneous amplitude of the input bit and then discharged at a constant current. A zero detector and a logic comparator are employed for determining the binary value of the bit based on the length of time it takes the capacitor to discharge down to a voltage level set by a clamping circuit.

8 Claims, 6 Drawing Figures

PCM DETECTOR

BACKGROUND OF THE INVENTION

The present invention relates to a pulse detection circuit in high speed PCM (pulse code modulation) transmission, said pulses being transmitted according to either a NRZ (Non-Return-to-Zero) method or an alternate polarity (bipolar signal) method.

In both of these methods, the average level of the transmitted signal is approximately zero and the two problems to be solved in order to obtain a precise detection of binary value of a bit are (1) to have sufficient time to make the bit decision, and (2) to choose the threshold value which determines the frontier between the two possible binary values of a bit.

In high speed PCM transmission (10 Megabauds for example) the bit period *t* (100 ns (nanoseconds)) is too low to make a correct bit decision by comparing the amplitude of the input signal with a voltage threshold.

SUMMARY OF THE INVENTION

In the present invention, the input signals are demultiplexed by distributing them to *n* channels in such a way that the available decision time is *n* bit time slots, i.e., *n.t.* In each channel, a holding capacitor stores the energy received during the time slot of a bit and the capacitor is then discharged with a constant current. Thus, the bit decision can be made by establishing a time threshold instead of the usual voltage threshold.

This method offers several advantages: (1) the distributor is an ECL (emitter-coupled logic) type circuit which operates very easily at high speeds, and (2) the holding capacitors can have very broad tolerances.

Thus, an object of the present invention is to provide a pulse detection circuit for PCM signals (bits) transmitted at high speeds.

A feature of the present invention is the provision of a detector to determine the binary value of high speed pulse code modulation bits in time sequence comprising: an input for the bits, each of the bits having a duration equal to *t; n* signal channels, where *n* is an integer greater than one; first means coupled to the input and the *n* channels to connect the bits sequentially to different ones of the *n* channels to provide a processing time for each of the bits equal to *nt;* n holding capacitors, each of the holding capacitors being in a different one of the *n* channels, each of the holding capacitors being charged for a time *t* by a current whose amplitude depends upon the amplitude of an associated one of the bits at the input and discharged by a constant current; *n* zero detectors, each of the zero detectors being in a different one of the n channels and coupled to an associated one of the capacitors, each of the zero detectors providing a first output signal as long as the voltage across the associated one of the capacitors is positive; and *n* logic comparators, each of the logic comparators being in a different one of the *n* channels and coupled to an associated one of the zero detectors, each of the logic comparators being responsive to a first timing signal occupying the second half of the $(n-1)$. $t^{th}$ channel time slot and the first output signal of the associated one of the zero detectors to define a time threshold for the determination of the binary value of the associated one of the bits, each of the comparators producing a second output signal in the second half of the $n{\cdot}t^{th}$ channel time slot as determined by a second timing signal, the second output signal having a high level if the value of the associated one of the bits is a binary 1 and a low level is the value of the associated one of the bits is a binary 0.

BRIEF DESCRIPTION OF THE DRAWING

Above-mentioned and other features and objects of this invention will become more apparent by reference to the following description taken in conjuncation with the accompanying drawing, in which.

DESCRIPTION OF THE PREFERRED EMBODIMENTS

Figure 1:
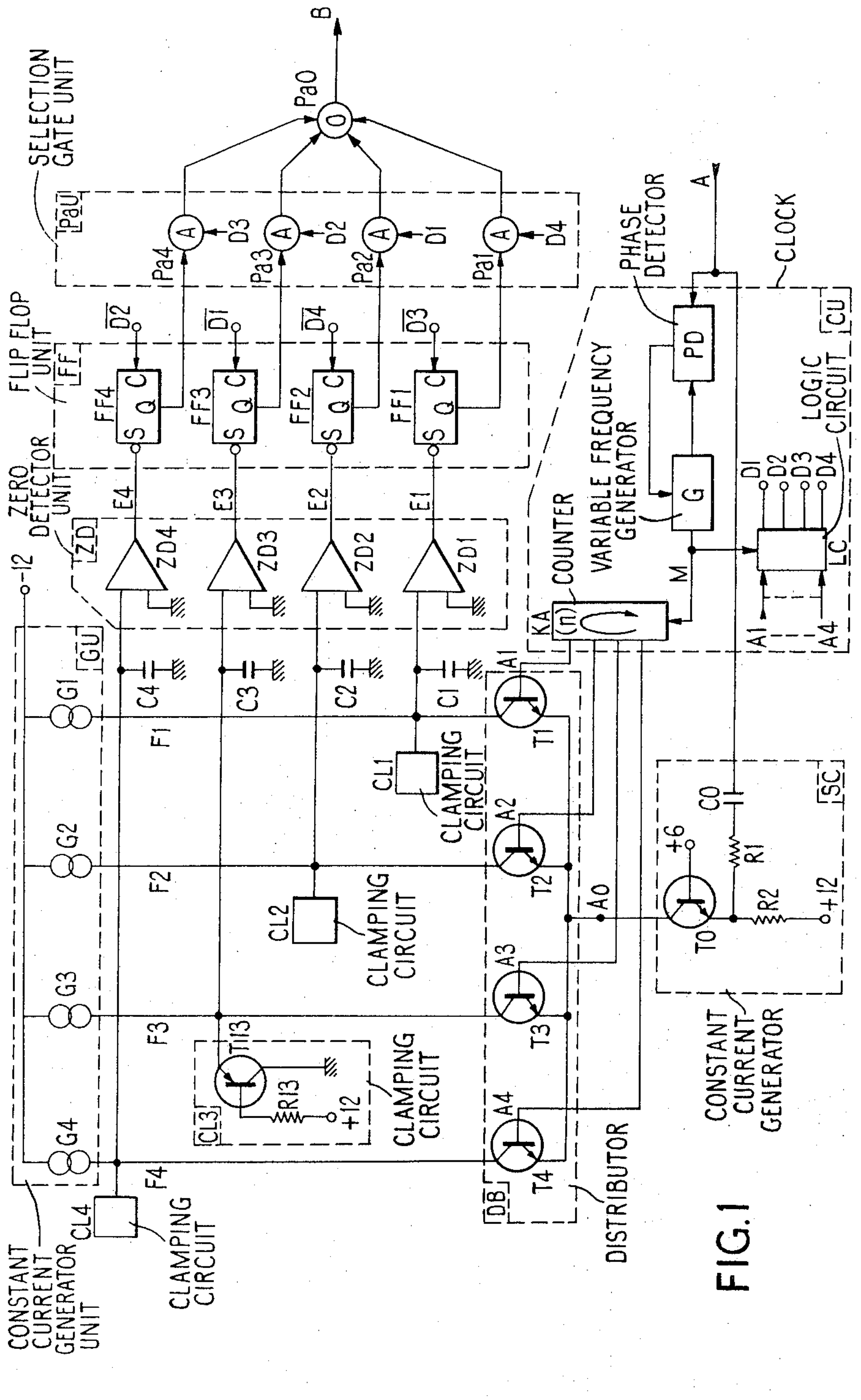
FIG. 1 is a block diagram, partially in schematic form, of the PCM detector according to the principles of the present invention.
Figure 2:
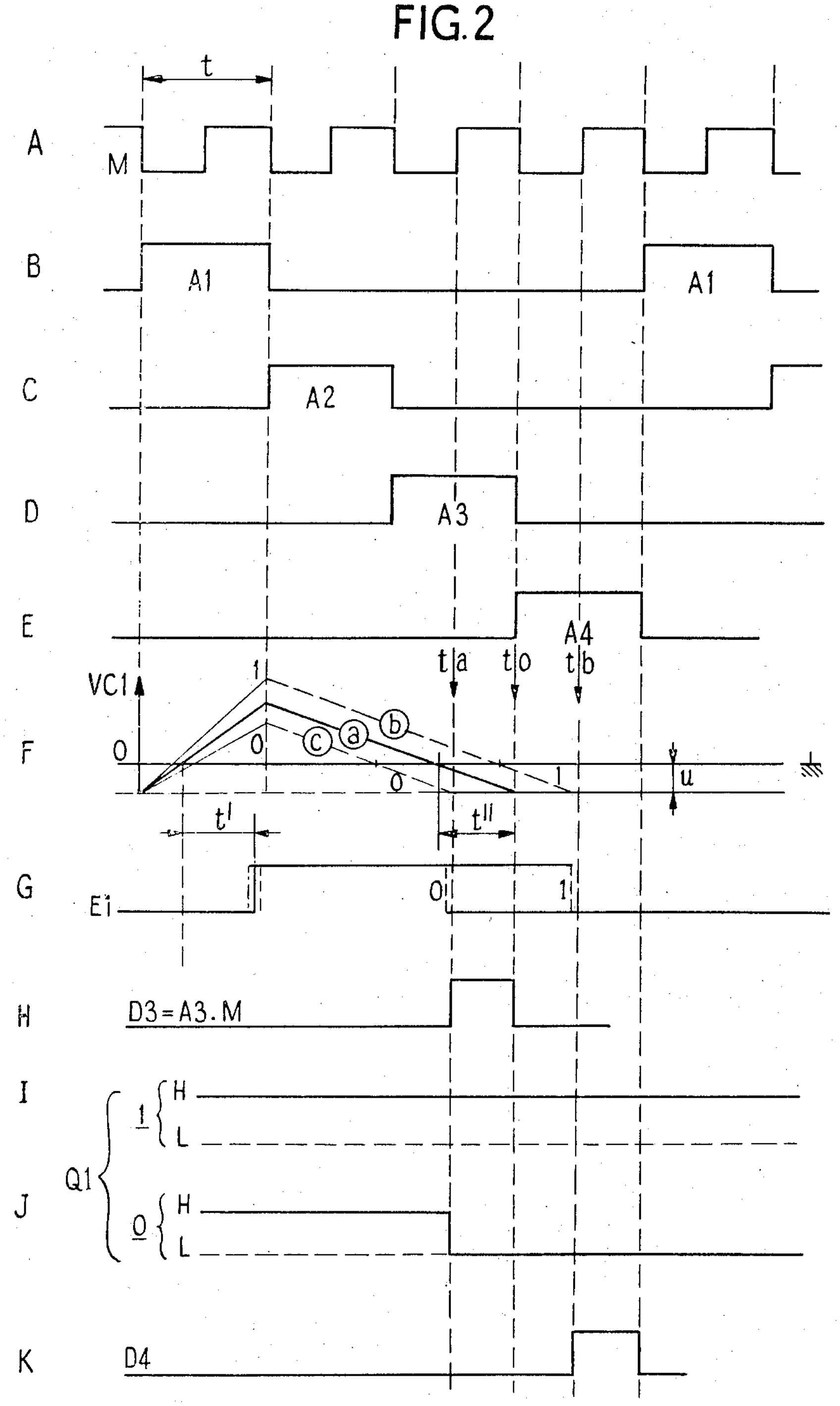
FIG. 2 illustrates a timing diagram of the operation of the detector of FIG. 1 for NRZ signals.

FIG. 1 is a detailed block diagram, partially in schematic form, of the PCM detector according to the principles of the present invention. This detector, designed to process signals (PCM bits) transmitted at high speed, includes input A to which are applied said signals and an output B furnishing regenerated and retimed signals (PCM bits). The signal processing operations are controlled by the signals supplied by the clock CU which comprises: (1) the regeneration circuit which receives the signals A and furnishes the bit time slot signals t illustrated in Curve C, FIG. 2. As an example this circuit is composed of a phase lock loop containing the phase detector PD and the variable frequency oscillator G; (2) the channel time counter KA which is, for example, a *n*-position ring counter supplying repetitively the channel time slot signals A1, A2 . . . An. Curves B to E, FIG. 2 illustrate these signals for $n = 4$; and (3) the logic circuit LC which receives the signals M and A1 to An and which delivers the signals D1, D2 . . . Dn, such as, for example, D1 = M.A1 (the symbol "." representing the AND logic function). Curves H and K, FIG. 2 illustrate respectively the signal D3 and D4 for $n = 4$.

The input signals A having an instantaneous amplitude Vs are also applied to the transistor TO through the capacitor CO and the resistor R1. This transistor is connected as a current generator and it delivers a collector current of instantaneous amplitude (Io + Is), where Io is the constant current passing through the resistor R2 and $Is = Vs/R1$.

It will be noted that, if the transmission is effected with a modulation method such that the average value of the signal transmitted is zero, the average value of the collector current of transistor TO is equal to Io.

Figure 3:
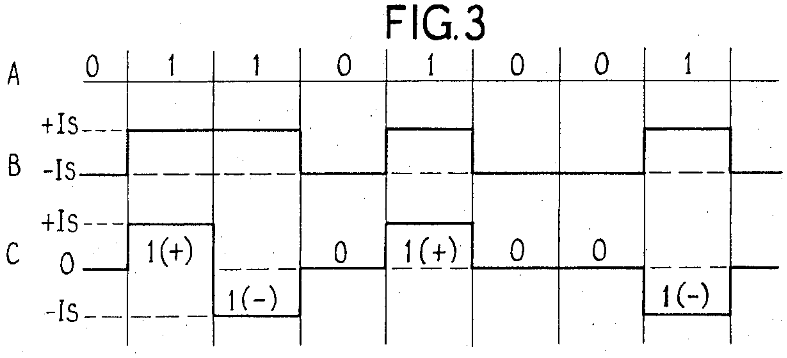
FIG. 3 illustrates NRZ and bipolar signals.

Curve A, FIG. 3 illustrates a binary number to be transmitted and Curves B and C FIG. 3 illustrate two modulation methods offering the above mentioned property of having an average value of zero. These are the two-level NRZ method (levels + Is and − Is, Curve B, FIG. 3) and the three-level alternate polarity method (levels + Is, 0 and − Is, Curve C, FIG. 3), these levels being respectively referenced 1 (+), 0 and 1 (−).

The collector current of transistor TO, amplitude modulated by the input signal, is switched to one of the *n* signal processing channels under the control of signals A1, A2 . . . An. It results that, for each input signal occupying a bit time slot of duration *t*, the total processing time *nt* is available. At the end of the processing the signals appearing on the n channels are strobed by signals D1, D2 . . . Dn and the regenerated and retimed signals appear in time sequence on the output B.

In FIG. 1, *n* = 4 and the four signal processing channels for NRZ signals comprise: (1) the distributor DB including the transistors T1–T4 (abbreviation for: T1, T2, T3, T4) which, in association with the transistor TO, forms an emitter-coupled circuit. These transistors are controlled by signals A1–A4 and control the switching of the current (Io + Is) on outputs F1–F4; (2) the current generator unit Gu which contains the generators G1–G4 which absorb current Id on the conductors F1–F4; (3) the set of the holding capacitors C1–C4 which are connected to the conductors F1–F4; (4) the voltage clamping circuits CL1–CL4 also connected to the conductors F1–F4: (5) the zero detector unit ZD which contains the zero detectors ZD1–ZD4; (6) the flip flop unit FF which contains the JK type flip-flops FS1–FS4. These flip-flops are controlled by signals applied to their inputs "S" (setting in 1 state) and "C" (setting in 0 state). The circle placed on the input S of each flip-flop represents an inverter circuit; (7) the selection gate unit PaU which contains the AND gates Pa1–Pa4; and (8) the OR output gate Pa0.

Figure 4:
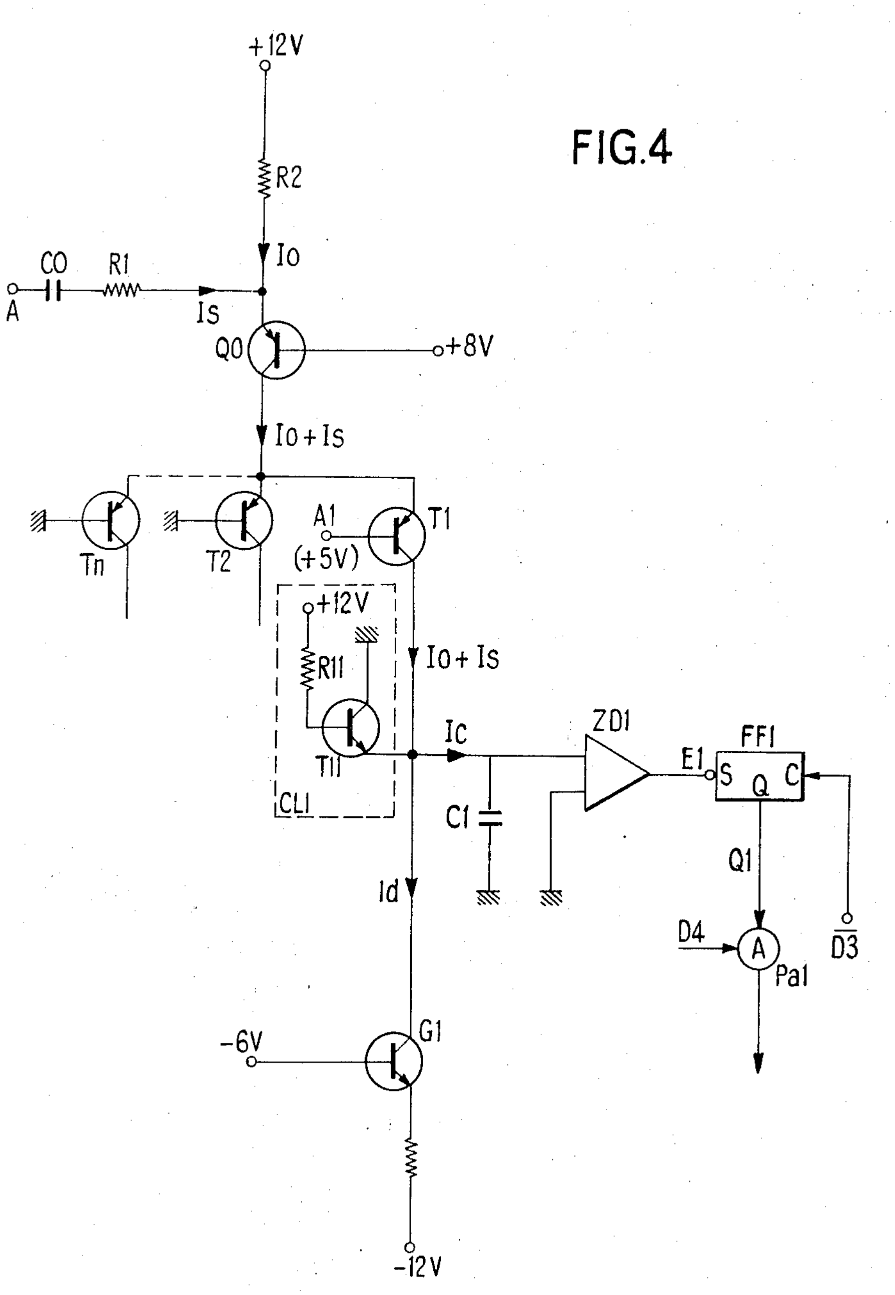
FIG. 4 is a schematic diagram, partially in block form, of the circuits associated with a channel of FIG. 1.

The operation of the circuits of a processing channel, channel 1, for example, which is selected by signal A1, will now be described with respect to FIG. 4.

As was seen above, the currents supplied by T1 and absorbed by G1 have respectively the values (Io + Is) and Id. It results that, if the circuit CL1 is not taken into account, the load current of capacitor C1 is: Ic = Io + Is − Id (1).

If the current Is was constant, capacitor C1 would charge linearly during the application time *t* of the signal A1 as shown in Curve F, FIG. 2 with a slope *Ic/C*. But actually, the received signals do not have step edges so that the voltage across the terminals of the capacitor, at the end of the time *t*, is proportional not to the amplitude but to the energy of the signal.

At the end of signal A1, transistor T1 blocks and capacitor C1 discharges with a constant current Id in such a way that the voltage decreases linearly with a slope − Id/C.

In voltage clamping circuit CL1, the transistor T11 is saturated as long as the voltage VC1 across the capacitor terminals is lower than ground potential and it maintains this voltage at a value *u* which is the collector to emitter voltage at saturation of T11. When VC1 increases, owing to the presence of the current Is, this transistor operates in an inverse manner and the equation (1) becomes valid.

It will be noted that, during the inverse operation of transistor T1, a current Id is extracted from the capacitor so that, in the absence of the circuit CL1, the potential VC1 would tend towards − 12 volts.

The voltage across capacitor C1 is continuously tested by the zero detector ZD1 whose output signal E1, shown in Curve G, FIG. 2 is present during the time interval separating the two zero crossovers of voltage VC1. It will be nevertheless noted that the rise and fall times of this signal are delayed by *t'* and *t''* as compared to the zero crossovers due to the response time of the zero detector.

The output of detector ZD1 is connected to the input S of flip-flop FF1 whose input C receives the signal D3 shown in Curve H, FIG. 2. As an example this flip-flop is an TTL (transistor transistor logic) integrated circuit whose operation is given in the truth table of TABLE I and in which: (1) the High (+ 5 volts) and Low (0 volt) levels of TTL logic are designated respectively "H" and "L"; (2) E1 and D3 are the signals shown in Curves G and H, FIG. 2; (3) $\overline{E1}$ and $\overline{D3}$ are the complementary signals applied respectively to inputs S and C at time *tm;* and (4) the column (*Qm* + 1) give the state of the output Q of the flip-flop at time (*tm* + 1).

TABLE I shows the signal level on the output Q in function of the levels of signals E1 and D3.

TABLE I

Levels on the Q output of FF1

| *tm* | | | | (*tm* + 1) |
|---|---|---|---|---|
| E1 | D3 | $\overline{E1}$ | $\overline{D3}$ | (*Qm* + 1) |
| H | L | L | H | H |
| L | H | H | L | L |
| H | H | L | L | H |
| L | L | H | H | *Qm* |

According to this TABLE and to Curves G and H, FIG. 2 it can be seen that the rules giving the level on the output Q of FF1 can be stated as follows: (1) if the end of the signal E1 occurs during signal D3, the output Q of the flip-flop is at level L at the following channel time slot (Curve J, FIG. 2); and (2) if the end of the signal E1 occurs after the signal D3, the output Q is at level H at the following channel time slot (Curve I, FIG. 2).

The cooperation of detector ZD1 and flip-flop FF1 enables a time threshold to be established in order to make the bit decision, that is, the discrimination between the two possible bit values (0 and 1). The value of this threshold is fixed by the relative value of currents Io and Id and by the value of the resistor R1.

When receiving NRZ signals with an average value Is = 0, this current is chosen as the threshold between the bit values 0 and 1. For this value of current, capacitor C1 charges with a current Ic = Io − Id during a time *t* (positive ramp *a*, Curve F, FIG. 2). At the end of this time, capacitor C1 discharges with a current Id during a period chosen to be equal to (*n* − 2)·*t* if the general case is considered where *n* is higher than 2. Curve F, FIG. 2 checks this equation and shows that, for *n* = 4, the discharge (negative going ramp *a*, Curve F, FIG. 2) is complete at time to, at the end of the next to last channel time slot.

Therefore *Io*/*Id* = 1 + *n*—2, i.e., when *n* = 4, *Io*/*Id* = 3.

Moreover the peak value of the current Is is fixed by the value of resistor R1. This value is so chosen that, for modulation peaks corresponding to the extreme values ± Ism of the received signals, the discharge time ends between times *ta* and *tb* (Curve F, FIG. 2) which defines a time interval of ± ½ channel time slot on each side of the time to.

As shown above, the Q output of the flip-flop FF1 is, after time *tb*, at the level H or L according as to whether the discharge has been terminated in the time interval *ta*—*to* (detection of an 0, ramp *c* Curve F, FIG. 2), or in interval *to*—*tb* (detection of a 1, ramp *b* Curve F, FIG. 2), (the interval ta-to corresponds to signal D3, Curve H, FIG. 2).

This voltage, the H or L output of flip flop FF1, is sampled in gate Pa1 by the signal D4 (Curve H, FIG. 2), and the result is coupled to OR gate Pa0.

On output B of this circuit, half-baud pulses are collected which correspond to bits of value 1.

Figure 5:
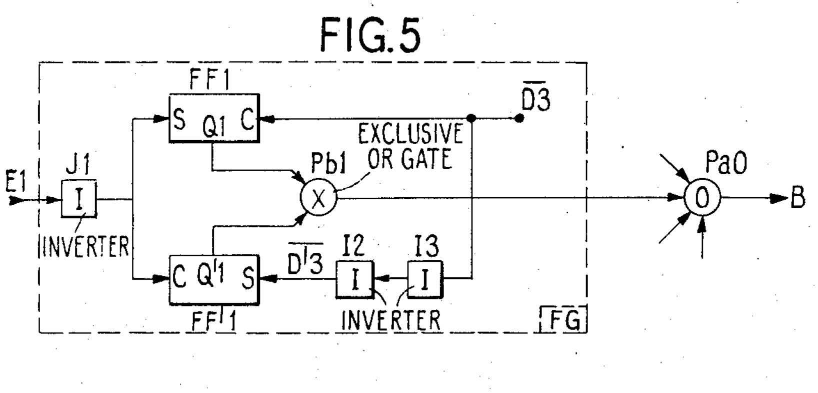
FIG. 5 is a block diagram of the logic comparator of FIG. 1 for bipolar signals.

For processing alternate polarity signals (see Curve C, FIG. 3), the circuit in FIG. 1 is used with the exception of the blocks FF and PaU which are replaced by four blocks FG (where $n = 4$). FIG. 5 illustrates the circuit of block FG allotted to the processing of channel 1 which is selected by signal A1. This circuit contains the inverters I1, I2 and I3, the JK flip-flops FF1 and FF'1 and the EXCLUSIVE OR gate Pb1. It will be noted that the flip-flop FF1 is connected in the same way as the flip-flop FF1 in FIG. 1 while the connections of FF'1 are reversed, signal $\overline{E1}$ being connected to input C and the clock signal $\overline{D'3}$ to input S.

Figure 6:
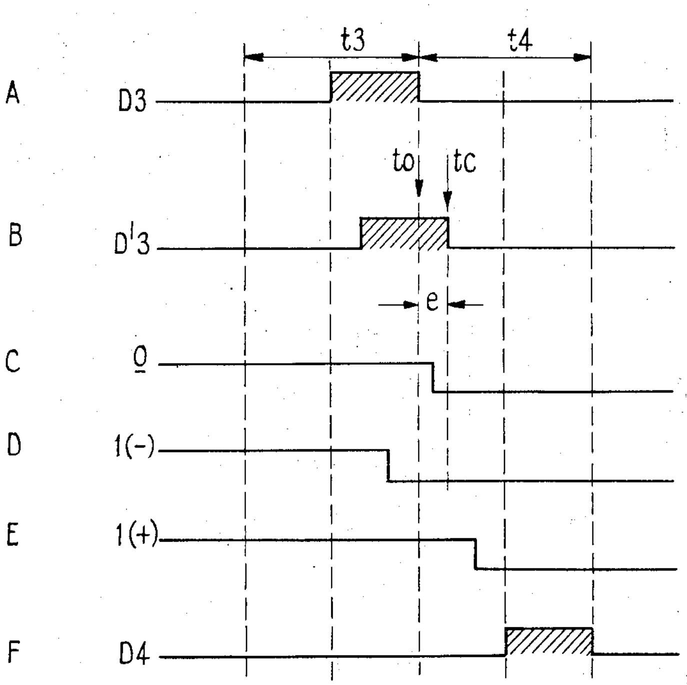
FIG. 6 illustrates a timing diagram of the operation of the detector of FIG. 1 for bipolar signals.

Signal D'3 shown Curve B, FIG. 6 is obtained by delaying signal D3 (Curve A, FIG. 6) for a period ($tc-to$).

Curves C, D and E, FIG. 6 show the end of the signal E1 for the three signal levels in the alternate polarity method, i.e., level 0, level 1 (−) and level 1 (+).

It will be noted that it is necessary to slightly modify the value of the ratio $Io/Id$ so that the theoretical position of the end of the signal E1 for a 0 digit falls in the middle of the time interval ($tc-to$) = $e$.

The operation of the circuit follows the same rules as those stated in TABLE I. However, it must be recalled that they are reversed for the interpretation of the operation of flip-flop FF'1.

TABLE II shows the voltage levels of the output signal delivered by EXCLUSIVE OR gate Pb1.

TABLE II

Voltage levels in the circuit FG

| Input signal level | Voltage levels On Q1 | On Q'1 | At output Pa1 |
|---|---|---|---|
| 1 (−) | L | H | H |
| 1 (+) | H | L | H |
| 0 | H | H | L |

It can be seen that there is a level H or L on output B according to whether the received bit is a 1 or a 0.

The delayed signals D' 1 to D'4 can be obtained in various manners, but the value ($tc-to$) must be chosen so that the detection zone of a bit 0 be sufficiently wide so that low amplitude parasites do not appear as bits of value 1.

In FIG. 5, this delay is obtained by the series connection of the inverters I2 and I3. It will be noted that two TTL inverters give a delay of 14 ns which is perfectly compatible with a channel time slot $t$ = 100 ns. This delay can also be obtained with either a delay line or with signals in phase quadrature with the clock signals D1 to D4.

While we have described above the principles of our invention in connection with specific apparatus it is to be clearly understood that this description is made only by way of example and not as a limitation to the scope of our invention as set forth in the objects thereof and in the accompanying claims.

We claim:

1. A detector to determine the binary value of high speed pulse code modulation bits in time sequence comprising:

an input for said bits, each of said bits having a duration equal to $t$;

$n$ signal channels, where $n$ is an integer greater than one;

first means coupled to said input and said $n$ channels to connect said bits sequentially to different ones of said n channels to provide a processing time for each of said bits equal to $nt$;

$n$ holding capacitors, each of said holding capacitors being in a different one of said $n$ channels, each of said holding capacitors being charged for a time $t$ by a current whose amplitude depends upon the amplitude of an associated one of said bits at said input and discharged by a constant current;

$n$ zero detectors, each of said zero detectors being in a different one of said $n$ channels and coupled to an associated one of said capacitors, each of said zero detectors providing a first output signal as long as the voltage across said associated one of said capacitors is positive; and $n$ logic comparators, each of said logic comparators being in a different one of said $n$ channels and coupled to an associated one of said zero detectors, each of said logic comparators being responsive to a first timing signal occupying the second half of the $(n-1)\cdot t^{th}$ channel time slot and said first output signal of said associated one of said zero detectors to define a time threshold for the determination of the binary value of said associated one of said bits, each of said comparators producing a second output signal in the second half of the $n\cdot t^{th}$ channel time slot as determined by a second timing signal, said second output signal having a high level if the value of said associated one of said bits is a binary 1 and a low level if the value of said associated one of said bits is a binary 0.

2. A detector according to claim 1, further including an OR gate coupled to each of said logic comparators to provide a third output which is a regenerated version of said bits.

3. A detector according to claim 2, further including $n$ voltage clamping circuits, each of said clamping circuits being coupled to a different one of said capacitors.

4. A detector according to claim 3, wherein said first means includes a phase locked loop having a variable frequency generator, and a phase detector coupled to said generator and said input to produce a control signal for coupling to said generator to control the frequency thereof, a counter coupled to said generator to produce n channel timing signals at $n$ different times, each of said channel timing signals having a duration equal to $t$, logic circuitry coupled to said counter and said generator to produce $n$ gate timing signals, each of said gate timing signals having a duration equal to $t/2$ and time coincident with the last half of a different one of said channel timing signals, a first transistor coupled to said input, said first transistor being connected as a constant current generator, and n second transistors, each of said second transistors having their emitters coupled in common to the collector of said first transistor, their collectors coupled to a different one of said capacitors and their bases coupled to said counter, each of said second transistors being rendered conductive by a different one of said channel timing signals.

5. A detector according to claim 4, wherein
said bits have a non-return-to-zero form, and
each of said logic comparators include a JK flip flop having its S input coupled to said associated one of said zero detectors and its C input coupled to said logic circuitry responding to the complement of a predetermined one of said gate timing signals, and an AND gate coupled to an output of said flip flop and said logic circuitry responding to a predetermined one of said gate timing signals to produce said second output signal.

6. A detector according to claim 4, wherein
said bits have a bipolar form, and
each of said logic comparators include a first JK flip flop having its S input coupled to said associated one of said zero detectors and its C input coupled to said logic circuitry responsive to the complement of a predetermined one of said gate timing signal, a second JK flip flop having its C input coupled to said associated one of said zero detectors and its S input coupled to said logic circuitry responsive to a delayed version of said complement of said predetermined one of said gate timing signal, and an EXCLUSIVE-OR gate coupled to the output of each of said first and second flip flops to produce said second output signal.

7. A detector according to claim 3, wherein
said bits have a non-return-to-zero form, and
each of said logic comparators include a JK flip flop having its S input coupled to said associated one of said zero detectors and its C input responding to said first timing signal, and an AND gate coupled to an output of said flip flop responsive to said second timing signal to produce said second output signal.

8. A detector according to claim 3, wherein
said bits have a bipolar form, and
each of said logic comparators include a first JK flip flop having its S input coupled to said associated one of said zero detectors and its C input responsive to said first timing signal, a second JK flip flop having its C input coupled to said associated one of said zero detectors and its S input responsive to a delayed version of said first timing signal, and an EXCLUSIVE-OR gate coupled to the output of each of said first and second flip flops to produce said second output signal.

* * * * *